Patented Sept. 22, 1953

2,653,081

UNITED STATES PATENT OFFICE 2,653,081

PROCESS FOR PRODUCING FERRIC OXIDE COMPOSITIONS OF POLISHING GRADE

Robert A. Stephens, Palmer Township, Northampton County, Pa., assignor, by mesne assignments, to C. K. Williams & Co., East St. Louis, Ill., a corporation of Delaware No Drawing. Application January 6, 1948, Serial No. 802

5 Claims. (Cl. 23—200)

This invention relates to new ferric oxide compositions, especially to polishing rouges, and a method of producing the same.

The polishing efficiency of ferric oxide products depends upon their source as well as upon the method by which they are produced or purified. Although natural and synthetic ferric oxides have for many years been used for polishing and pigmenting purposes, high grade polishes for the most part have been produced by synthesis from chemical solutions. The oxides produced in this manner are extremely pure and the polishing qualities are quite high. Efforts to produce high grade polishing rouges from natural or crude raw materials have been commercially successful to only a limited extent due to the presence of impurities which either mask or cause deterioration of the abrasive qualities of the rouge.

An object of the present invention is to provide a new ferric oxide composition having excellent polishing characteristics from inexpensive raw or crude materials. Another object is to produce products from such crude materials at a low cost thereby to provide superior polishing rouges capable of being marketed at a more reasonable price than the rouges prepared synthetically at the present time.

There are a number of natural and byproduct crude iron oxide compositions constituting potential sources of polishing rouges which, because of their contamination with organic matter, have heretofore been considered unsuitable for the production of high grade polishing rouges. One might expect that these raw materials could be oxidized and purified adequately by a calcination for burning off the organic material present, but considerable experimentation has revealed that calcination at temperatures designed to produce rouges of high abrasive power required by the industry leaves organic matter or a carbon content in the material which is detrimental to the polishing capabilities, whether it be of graphitic or amorphous character, due to a masking of the abrasive qualities, thereby initially reducing and progressively reducing the abrasive qualities as the same are used in polishing operations. Such experimentation has also revealed that calcination at temperatures sufficiently high to oxidize and completely remove the organic matter or carbon content does not produce rouges or iron oxides of a structure having sufficiently high abrasive power to satisfy commercial requirements. The loss of abrasive quality has been found to arise from the tendency of the carbon retained in the iron oxide after calcination to adhere to the polishing pads and in time to coat the same, with the result that the abrasive action of the rouge is substantially diminished.

It has now been discovered that a high quality rouge capable of maintaining high polishing rates over long periods of time can be produced from crude iron oxide materials generally containing from one to two per cent of organic material, generally referred to as ferroso-ferric oxide sludges which are formed in the reduction of organic chemicals by iron in acid solution, such as in the reduction of nitrobenzene to aniline, the reduction of p-nitroacetanilide to the corresponding amino compound, the reduction of aromatic polynitro compounds to aminonitro derivatives and other similar reduction processes. (Such processes are described for example in the text "Organic Chemistry," by Frank C. Whitmore, pages 739–740, D. Van Nostrand Company, Inc., 1938, and in the "Text Book of Organic Chemistry," by Bernthsen and Sudborough, page 648, D. Van Nostrand Company, Inc.).

The production of the ferric oxide compositions having the high polishing qualities involves a combination of a calcining treatment with a carbon separation treatment applied to the calcined material. These treatments, hereinafter defined more in detail, very successfully remove the objectionable impurities and reduce the carbon content to an amount which does not in any way interfere with the continued abrasive action of the rouge even for the life of the polishing pads employed. Through experimentation it has been determined that in order for the rouge to possess these qualities, the carbon content therein must be reduced to an amount producing a product having not in excess of 0.15% carbon.

To produce the ferric oxide compositions of the present invention from the ferroso-ferric oxide sludge, I have originated a process which involves calcination in combination with a flotation treatment for the separation of the carbon present in the iron oxide after it has been calcined.

In accordance with this process, the hereinbefore mentioned ferroso-ferric oxide sludge is calcined at a temperature of from 500° C. to 900° C. to effect three results. The ferroso-ferric oxide is oxidized to ferric oxide, the organic matter and other impurities are partially vaporized off and the remaining organic matter is reduced to the form of carbon.

The calcined material is then preferably ground in water to provide a slurry containing the oxide particles for the most part of a size passing through a 325 mesh screen. The slurry thereby obtained with or without the addition of a flotation agent such as cresylic acid or pine oil or mixtures of the same, is then passed through a series of four flotation cells, more or less, the number of cells depending upon their size and also the desired throughput rate of oxide. In the flotation treatment the carbon content rises to the surface and is floated off. Substantially freed of carbon, the slurry is then run through a classifier to remove the oversize particles and thence consecutively through a thickener and a filter. The damp material next is run through a drier from which it is led to a packaging machine for marketing. The removal of the carbon does not change the inorganic content of the calcined product.

The rouges manufactured from black iron oxide sludge average between 92% and 93% ferric oxide, the balance being impurities composed mostly of complex forms of silica, alumina and iron aluminum silicates.

The performance of the polishing rouges of the present invention having low carbon content is evidenced by the following tests:

The first test measures the polishing rate of rouges during polishing of a plano lens for a specified period of time, suitably about ten minutes, using a water slurry of the polishing material, the results being designated by the loss in weight of the lens in milligrams during the polishing period. This loss in weight or rate of removal is the measure of the polishing speed of the rouge.

A sample of calcined ferroso-ferric oxide sludge, obtained as a waste product in the reduction of nitrobenzene to aniline by iron in acid solution, containing 0.43% carbon had a rate of removal of 71 milligrams during a polishing period of ten minutes. A second sample of a calcined ferroso-ferric oxide sludge treated by the flotation treatment herein defined to reduce the carbon content to 0.12% had a rate of removal of 76 milligrams during the same polishing period.

In a second test using actual polishing shop practices, it was found that when the above-mentioned ferric oxide rouge containing 0.43% carbon was used on a polishing machine, not only was there a reduced initial polishing rate, but there was a gradual increase in the number of rejected lenses from the machine due to under polishing, although in such process the rouge slurry was renewed periodically. In contrast thereto, when the above-described ferric oxide rouge of the present invention containing 0.12% carbon was used in the same machine and under the same conditions, there was no increase in the number of rejected lenses due to any decreased polishing speed.

An examination of the felt pads used in the polishing operation employing the high carbon content rouge showed an accumulation of carbon, whereas an examination of the pads after employing the low carbon content rouge showed no accumulation of carbon. When the low carbon content rouge of the present invention is employed, the polishing pad can be used continuously in normal operations for a period of about two weeks until the pad itself wears out. In contrast thereto polishing operations using the high carbon content rouge require replacement of the pad every two days if a workable high polishing rate is to be maintained without having an excessive number of rejects.

The high grade rouges of the present invention are suitable for the polishing of lenses of the ophthalmic and precision type, also optical pieces such as reticles, prisms and the like and as well of plate glass and mirror glass.

Although the iron oxide compositions of the present invention are particularly suitable for polishing purposes, they also find utility for pigmenting purposes. The substantial reduction of the carbon content provides pigments of brighter color. However, the carbon content need not be reduced to the low percentage required in the production of the high grade polishing rouges, for any substantial removal of the carbon leads to brighter colors, and the greater the carbon removal, the brighter the color becomes.

In the production of the ferric oxide for pigmenting purposes, the calcination is conducted in a manner and at temperatures indicated by conventional calcining practice for obtaining ferric-oxide products of the desired shade. Regardless of the shade obtained, the treatment of the calcined product to reduce the carbon content in accordance with the herein-described process leads to brighter products.

The process as applied to bog iron ore and the products resulting therefrom are claimed in the copending application Serial No. 801 filed concurrently herewith.

It should be understood that the products of the present invention are not limited to the specific descriptive matter set forth herein except as recited in the claims appended hereto.

I claim:

1. A process for producing a high grade polishing rouge which comprises calcining a mass consisting essentially only of ferroso-ferric oxide sludge containing a small percentage of organic material and obtained by the reduction of organic compounds by iron in acid solution, said calcination being carried out at a temperature producing an iron oxide of a structure having a high abrasive power and which temperature burns off part of the organic material present leaving carbon and the inorganic matter of the sludge as impurities, grinding the impure calcined oxide, forming a slurry of the resulting impure ferric oxide carbon mixture, subjecting the slurry to a flotation treatment in which the carbon is floated and substantially separated leaving the impure ferric oxide containing carbon in an amount not in excess of 0.15% and inorganic impurities from the crude oxide treated composed mostly of complex forms of silica, alumina and iron aluminum silicates, and classifying the ferric oxide mass obtained to provide a ferric oxide product at least as fine as 325 mesh particle size.

2. A process suitable for producing high grade polishing rouges which comprises treating ferroso-ferric oxide sludge containing organic and inorganic impurities and obtained by the reduction of organic compounds by iron in acid solution by a combination of steps involving calcining a mass consisting essentially only of such sludge at a temperature between 500° and 900° C. thereby (1) imparting a structure of high abrasive power to the ferric oxide produced, (2) separating a part of the organic impurities by burning and volatilizing the same and (3) leaving an amount of carbon which if not subsequently removed would prevent successful use of the calcined product as a high grade polishing rouge, grinding the carbon-containing calcined mass to a powder, forming a slurry of said ground mass and subjecting this slurry to a flotation treatment whereby carbon is floated off to an extent providing a ferric oxide having a carbon content in an amount not in excess of 0.15% said oxide product containing the inorganic impurities of the sludge treated composed mostly of complex forms of silica, alumina and iron aluminum silicates.

3. A process suitable for producing high grade polishing rouges and bright ferric oxide pigments which comprises calcining a mass consisting essentially only of ferroso-ferric oxide sludge which contains a small percentage of organic material and obtained by the reduction of organic compounds by iron in acid solution, said calcination being carried out at a temperature producing an iron oxide of a structure having a high abrasive power and at the same time the temperature being insufficiently high to burn off all the organic material present thereby forming a mass composed principally of ferric oxide but containing inorganic impurities from the crude oxide treated and also a detrimental amount of carbon, forming a slurry of said mix and subjecting the slurry to a flotation treatment whereby the carbon is floated off to an extent leaving not in excess of 0.15% in the ferric oxide product thereby producing a ferric oxide product containing substantially only inorganic impurities from the crude oxide treated composed mostly of complex forms of silica, alumina and iron aluminum silicates.

4. A process for producing a high grade polishing rouge which comprises calcining a mass consisting essentially only of ferroso-ferric oxide sludge which contains a small percentage of organic material and obtained by the reduction of organic compounds by iron in acid solution at a temperature between 500° and 900° C. which produces iron oxide of a structure having a high abrasive power and leaves free carbon therein together with the inorganic impurities of the sludge treated, grinding the impure oxide obtained, forming a slurry of the calcined oxide and subjecting the slurry to a flotation treatment and thereby reducing the carbon content of the calcined material to an amount not in excess of 0.15% whereby there is obtained an iron oxide product containing substantially only inorganic impurities from the crude oxide treated composed mostly of complex forms of silica, alumina and iron aluminum silicates.

5. A process for producing a high grade polishing rouge which comprises calcining a mass consisting essentially only of ferroso-ferric oxide sludge which contains a small percentage of organic material and obtained by the reduction of organic compounds by iron in acid solution at a temperature between 500° and 900° C. which produces iron oxide of a structure having a high abrasive power and leaves free carbon therein together with the inorganic impurities of the sludge treated, grinding the calcined oxide to a fine particle size, forming a slurry of said calcined oxide and subjecting the said slurry to a flotation treatment in the presence of a frothing agent and thereby floating off the carbon to an extent providing a product containing an amount of carbon not in excess of 0.15%, whereby there is produced a ferric oxide product containing substantially only inorganic impurities from the crude oxide treated composed mostly of complex forms of silica, alumina and iron aluminum silicates.

ROBERT A. STEPHENS.

References Cited in the file of this patent

UNITED STATES PATENTS

| Number | Name | Date |
|---|---|---|
| 1,428,521 | Bacon | Sept. 12, 1922 |
| 1,455,060 | Bacon | May 15, 1923 |
| 1,634,615 | Hall et al. | July 5, 1927 |
| 1,793,942 | Laux | Feb. 24, 1931 |
| 1,806,888 | Buchanan | May 26, 1931 |
| 1,837,709 | Heckman | Dec. 22, 1931 |
| 1,849,428 | Laux | Mar. 15, 1932 |
| 1,943,948 | Castner et al. | Jan. 16, 1934 |
| 2,105,670 | Perkins | Jan. 18, 1938 |
| 2,183,500 | Crawford | Dec. 12, 1939 |
| 2,203,905 | Heckman | June 11, 1940 |
| 2,298,984 | Stinson et al. | Oct. 13, 1942 |
| 2,363,315 | Grothe | Nov. 21, 1944 |
| 2,396,398 | Turbett | Mar. 12, 1946 |